March 25, 1958     H. G. BORSHEIM     2,827,970
TRACTOR-MOUNTED HYDRAULIC CONTROL
Filed May 2, 1956     2 Sheets-Sheet 1

INVENTOR.
H. G. BORSHEIM

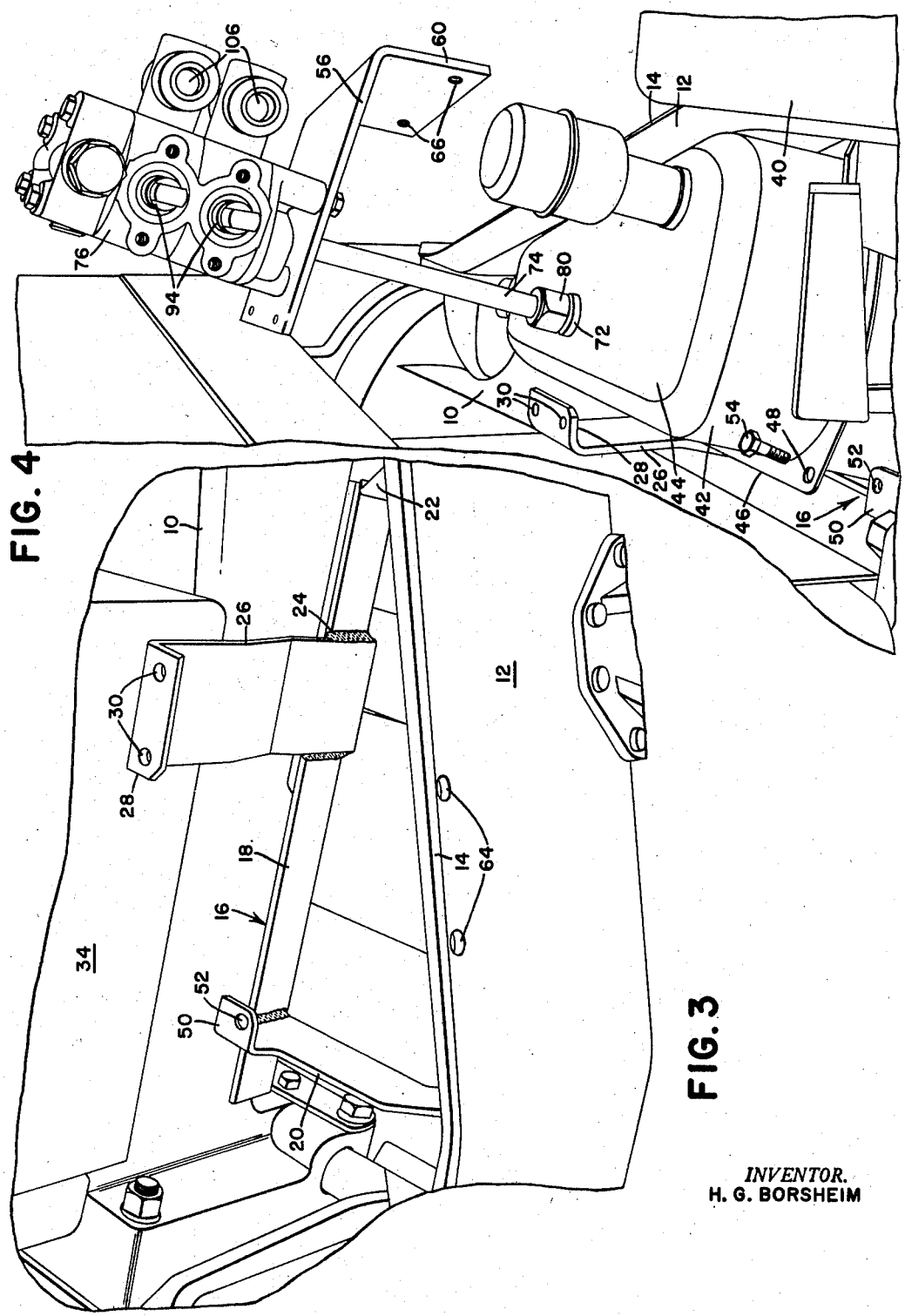

United States Patent Office 2,827,970
Patented Mar. 25, 1958

2,827,970

TRACTOR-MOUNTED HYDRAULIC CONTROL

Harold G. Borsheim, Dubuque, Iowa, assignor to Deere Manufacturing Co., Dubuque, Iowa, a corporation of Iowa Application May 2, 1956, Serial No. 582,278

14 Claims. (Cl. 180—1)

This invention relates to a tractor-mounted fluid control apparatus and more particularly to means for mounting several of the components of that mechanism.

A conventional tractor, such as that disclosed herein, includes a fore-and-aft body and additional frame parts, one of which is spaced laterally outwardly from the fore-and-aft part so that a space occurs between the member and the part, which space lends itself to the mounting of various control components for the tractor. In the present case, the space is utilized for mounting a tank or reservoir for the tractor hydraulic control system, and in this respect the invention has for an important object the provision of means for mounting the tank, means for mounting a control valve assembly with relation to the tank, and means providing a fluid line connection between the control valve assembly and the tank. Other features of the invention reside in the provision of removable means whereby the several components may be installed or removed with a minimum of trouble and labor. In a preferred embodiment, the improved mounting arrangement is provided ahead of an operator's station adjacent to which is a control element for controlling one or more valve spools in the valve housing assembly. The control connections are articulate and removable so as to facilitate removal and installation of the assembly, support and tank.

The foregoing and other important objects and desirable features inherent in and encompassed by the invention will become apparent as a preferred embodiment thereof is disclosed in detail in the ensuing specification and accompanying sheets of drawings, the several figures of which will be described immediately below.

Fig. 3 is a perspective of part of the tractor body and adjacent frame member with the tank, support and valve housing removed.

Fig. 4 is a rear perspective showing the manner in which the tank, support and valve housing may be removed and installed.

Figures 1, 2:
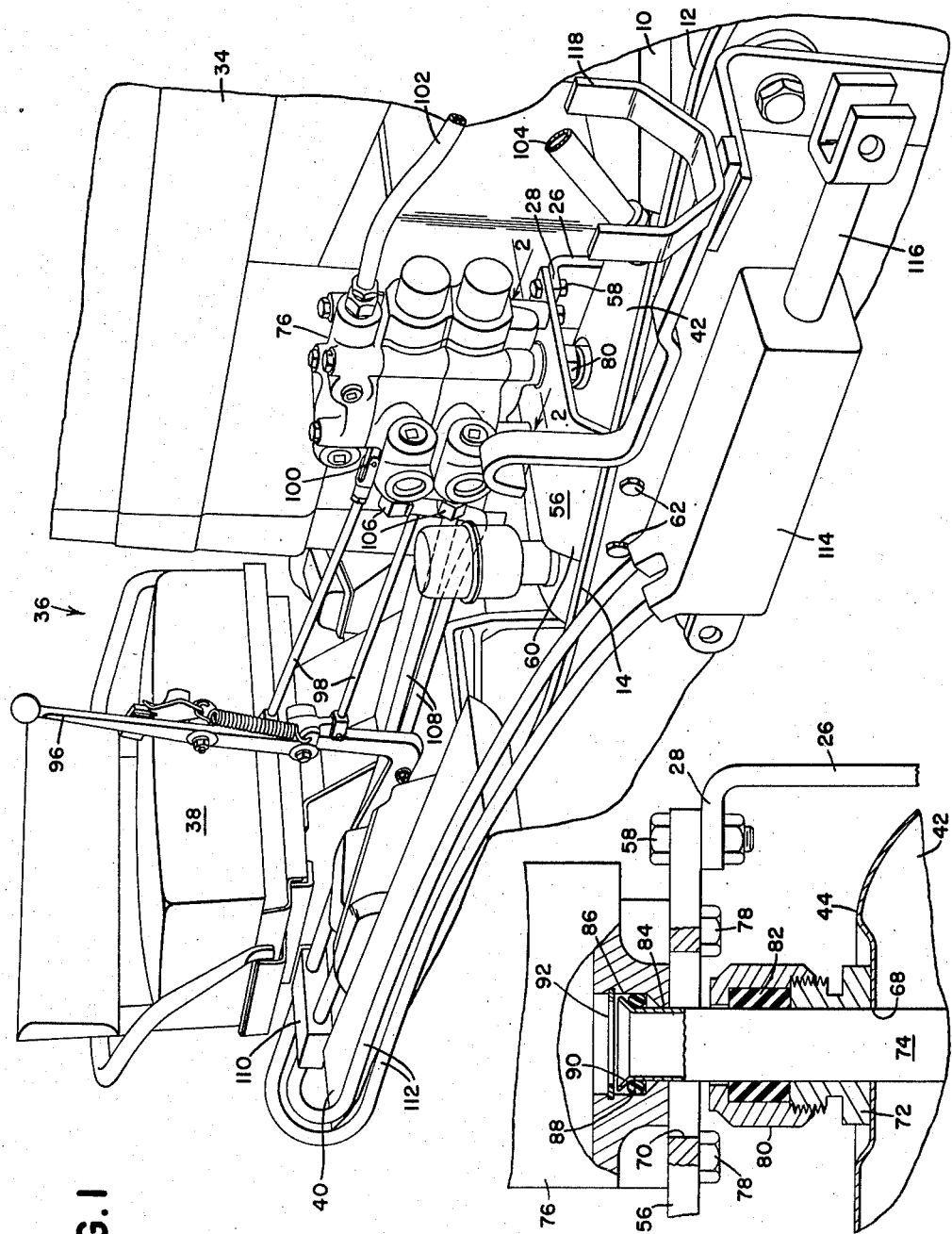
Fig. 1 is a perspective of the right hand portion of a tractor incorporating the invention.
Fig. 2 is an enlarged fragmentary sectional view taken substantially along the line 2—2 of Fig. 1.

The background structure chosen for the purposes of illustration comprises a tractor comprising a longitudinal fore-and-aft body 10 having at opposite sides thereof fore-and-aft side members, only one of which is illustrated at 12. As best shown in Fig. 3, the part 10 and frame member 12 are laterally spaced apart to afford between them a mounting space or compartment, the top edge as at 14 of the member 12 defining the top marginal portion of said space. Within the space is located tank-mounting means, here in the form of a subframe 16 made up of a fore-and-aft bar 18, a rear transverse bar 20 and a transverse front bar 22. In addition to the bars, the subframe has rigidly mounted thereon, as by welding at 24, an upstanding bracket 26 which rises to a top edge portion 28, apertured at 30, and disposed slightly above the level of the top edge 14 of the side member 12. The subframe 16 may be secured in place between the part 10 and member 12 in any suitable manner.

The fore-and-aft body part 10 includes conventional engine hood and fuel tank structure 34 behind which is located an operator's station 36 including an operator's seat 38 and delineated at opposite sides by fore-and-aft fenders, one of which is visible at 40. The space just defined, between the body part 10 and side frame member 12 conveniently houses or accommodates a tank or reservoir 42 which has a top wall 44 disposed slightly below the level of the top 28 of the bracket 26 and the top edge 14 of the side member 12. The tank 42 has marginal flange means 46, apertured at 48, and adapted to rest on a plurality of pads, such as that shown at 50 on the subframe 16 (Figs. 3 and 4). Each of these pads is apertured at 52 for receiving removable securing means of any conventional character, one of which is shown at 54 in Fig. 4. The tank 42, when mounted in place in the manner described, is conveniently housed in the mounting space and is protected at opposite sides by the part 10 and frame member 12.

A support 56 extends between the part 10 and member 12, bridging the tank 42, and this support has its inner edge appropriately apertured to receive removable securing means, such as bolts 58, which pass through the apertures 30 in the bracket top portion 28. The outer end of the support 56 has an integral angularly related portion 60 which is apertured to receive removable securing means, preferably cap screws 62, passed through apertures 64 in the member 12 (Fig. 3) and threaded into tapped bores 66 in the portion 60 of the support 56.

The support 56 is of relatively heavier material than the sheet metal structure of the tank 42 and therefore affords a top shield for the tank. The top wall 44 of the tank has an opening or aperture 68 therethrough which is in vertical register with a larger opening 70 in the support 56. An externally threaded fitting 72 is secured to the top wall 44 of the tank 42 coaxially with the opening 68 and is rigidly secured to the top wall as by soldering or brazing. This fitting, of course, surrounds the opening and receives therethrough a fluid line or tube 74 which extends downwardly into the tank and upwardly through the support opening 70 to a valve housing assembly 76 that is mounted on the support 56. Removable securing means, such as cap screws 78, secure the housing 76 to the top of the support 56. The tube 74 is additionally surrounded by an internally threaded fitting part 80 which contains an annular seal 82. When the components are assembled (Fig. 2) the fitting part 80 is threaded onto the fitting part 72 and the seal 82 establishes a seal between the tube or line 74 and the tank opening 68.

The upper end of the tube 74 is received in the valve housing 76 via a vertical bore 84 and a larger counterbore 86. A second seal 88 encircles the tube 74 within the counterbore 86, and the top end of the tube is flared at 90 to cooperate with the seal 88 and thus to hold the tube against downward withdrawal from the housing 76. The tube 74 is secured against upward withdrawal from the housing by means of a snap ring 92. This ring is, however, removable so that the tube can be deliberately withdrawn from the housing 76; or, conversely, the tube can be installed by downward insertion through the bore 84, after which the snap ring 92 is installed. During assembly and disassembly of the valve housing 76 relative to the support 56 or during the assembly and disassembly of the valve housing and support as a unit relative to the tank 42, the tube 74 remains with the housing 76. When installed, the valve housing 76 is secured to the support 56 by the cap screws 78 and the support 56 is secured in place by the bolts 58 and cap screws 62. When the nut 80 is tightened on the fitting 72, the tank 42 is in effect connected to the tube 74 and the tube 74 is connected to the housing 76, whereupon the tank receives support in addition to that received from the subframe 16.

The valve housing illustrated contains a pair of valve spools 94 selectively shiftable fore-and-aft by a control element 96 located conveniently to the operator's seat 38. The specific details of the valve housing, valve spools and control element form no part of the present invention and are illustrated as representative only. The valve spools are connected to the control element by control connections including fore-and-aft links 98, the forward end of each of which is removably connected to the respective valve spool as at 100. The removable connection, such as that just referred to, contributes to the ease with which the valve housing, support and tank may be installed and removed.

One of the reasons for the particular type of support and housing assembly described here is that it is often desirable to locate the valve housing 76, or a similar housing, at another place on the vehicle. In that case, or in the case of the desire to remove the assembly 76 for adjustment or repair, the assembly can be readily removed from the support 56 by removing the cap screws 78 and releasing the connection at 80—72, plus separation of the connections at 100. If it is desired to remove the housing 76 and support 56 as a unit, the connection at 80—72 is released and the bolts 58 and cap screws 62 are removed. This arrangement will be clear from Fig. 4.

The tank 42 affords a fluid reservoir for a hydraulic control system, and the valve housing 76 discharges to this reservoir via the fluid line or tube 74. Fluid under pressure is supplied to the valve housing as by a high pressure line 102, which is connected to the discharge side of any conventional pump (not shown), the intake side of which is connected to a fluid line 104 which leads to the tank 42 (Fig. 1). Fluid pressure outlets 106 are provided on the valve housing for connection to a pair of rearwardly extending fluid conduits 108 which terminate in a coupling or junction box 110 at the rear of the vehicle. Fluid conduits or hoses 112 are connected to the coupling box 110 and lead to opposite ends of a two-way remote cylinder 114 which is equipped with a piston 116 as is conventional. In the illustration in Fig. 1, the cylinder and piston assembly 114—116 is shown alongside of the tractor to illustrate its association with the valve housing 76. When in use, the cylinder and piston assembly may be connected between any pair of relatively movable parts associated with the tractor. When not in use, the assembly may be carried on a suitable bracket 118 as illustrated. The specific details of the cylinder and piston assembly and of the connection thereof to the tractor form no part of the present invention but are illustrated merely to orient the relationship of the control to the tractor.

Features of the invention not categorically enumerated herein will undoubtedly occur to those versed in the art, as will many modifications and alterations of the preferred embodiment shown, all of which may be achieved without departure from the spirit and scope of the invention.

What is claimed is:

1. In a tractor having a fore-and-aft body part and a side frame member alongside and spaced laterally from said part: a fluid reservoir positioned between the member and the part and having a top wall formed with an opening therein; a support extending laterally between and secured to the member and part and bridging the reservoir, said support having an opening therein in vertical register with the reservoir opening; a valve housing mounted on the support over the support opening and having a fluid line depending therefrom through the registered openings and into the reservoir; and means connecting the fluid line to the reservoir top wall and including a seal around the fluid line at and for sealing the reservoir opening.

2. The invention defined in claim 1, in which: the valve housing is detachably secured to the support for upward removal therefrom; the fluid line connecting means is releasable to free the fluid line from the top wall of the reservoir; and the fluid line is secured to the valve housing for upward withdrawal of said line through the registered openings upon upward removal of the valve housing.

3. The invention defined in claim 1, in which: the reservoir is of relatively light-weight material and the support is a plate-like element of substantially heavier material affording a shield for the reservoir.

4. The invention defined in claim 1, in which: the support is detachably secured to the member and part for upward separation of the assembled support and valve housing from said member and part; the fluid line connecting means is releasable to free the fluid line from the top wall of the reservoir; and the fluid line is secured to the valve housing for upward withdrawal of said line through the reservoir top wall opening upon upon upward separation and removal of the support and valve housing.

5. The invention defined in claim 1, in which: the valve housing has a bottom formed with an upright bore into which the upper end of the fluid line is relatively tightly received, said bore having a larger counterbore immediately adjacent to the upper end of the fluid line; a seal surrounds the fluid line at the junction of the bore and counterbore; the upper end of said line has an annular lip radially outwardly overhanging said seal to prevent downward withdrawal of the line from the valve housing; and the valve housing has releasable means in the counterbore engageable with the fluid line to normally prevent upward movement of the line into the housing.

6. In a tractor having a fore-and-aft body part including an operator's station and a side frame member alongside and spaced laterally from said part ahead of the operator's station: a fluid reservoir positioned between the member and the part and having a top wall formed with an opening therein; a support extending laterally between and secured to the member and part and bridging the reservoir, said support having an opening therein in vertical register with the reservoir opening; a valve housing mounted on the support over the support opening and having a fluid line depending therefrom through the registered openings and into the reservoir; and control means on the operator's station and including control connections to the valve housing.

7. The invention defined in claim 6, in which: the valve housing is detachably secured to the support for upward removal therefrom; the fluid line is connected to the valve housing and is upwardly withdrawable through the registered openings upon upward removal of the valve housing; and the control connections are separable from the valve housing to enable said upward removal of the valve housing.

8. The invention defined in claim 6, in which: the support is detachably secured to the member and part for upward separation of the assembled support and valve housing from said member and part; the fluid line is connected to the valve housing and is upwardly withdrawable through the registered openings upon upward removal of the support and valve housing; and the control connections are separable from the valve housing to enable said upward removal of the support and valve housing.

9. In a tractor having a fore-and-aft body part and a side frame member alongside and spaced laterally from said part to define a mounting space at one side of which the top edge of the frame member affords a fore-and-aft marginal portion; a generally horizontal subframe within the mounting space and below the level of said top edge and including an upstanding bracket adjacent to the body part and rising to a top portion adjacent to the level of said top edge; a tank disposed in said space and having flange means supported on the subframe, said tank having a top wall adjacent to the level of said top edge and said top portion of the bracket and said top wall having an opening therein; a support bridging the tank and secured to said top edge and top portion of the bracket and having an opening therein in vertical register with the top wall opening; a valve housing carried on the support over the registered openings and having a tube secured thereto and projecting through the openings and into the tank; means securing the housing to the support; and means securing the tube to the top wall of the tank.

10. The invention defined in claim 9, in which: the means securing the housing to the support is detachable for enabling upward removal of the housing from the support; and the means securing the tube to the tank is releasable to enable the tube to be withdrawn upwardly from the tank and through the support opening upon removal of the housing.

11. The invention defined in claim 9, in which: the support is removably secured to the side member top edge and bracket top portion for enabling upward removal of the support and valve housing as a unit; and the means securing the tube to the tank is releasable to enable the tube to be withdrawn upwardly from the tank upon removal of the support and housing.

12. In a tractor having a fore-and-aft body part and a side frame member alongside and spaced laterally from said part to define a mounting space at one side of which the top edge of the frame member affords a fore-and-aft marginal portion: tank-mounting means within the mounting space and below the level of said top edge and including an upstanding bracket adjacent to the body part and rising to a top portion adjacent to the level of said top edge; a tank disposed in said space and having flange means removably supported on the tank-mounting means for enabling upward removal of the tank from said space, said tank having a top wall adjacent to the level of said top edge and said top portion of the bracket and said top wall having an opening therein; a support bridging the tank and removably secured to said top edge and top portion of the bracket and having an opening therein in vertical register with the top wall opening; a valve housing carried on the support over the registered openings and having a tube secured thereto and projecting through the openings and into the tank; means securing the housing to the support; and means removably securing the tube to the top wall of the tank.

13. In a tractor having a fore-and-aft body part and a side frame member alongside and spaced laterally from said part: a fluid reservoir positioned between the member and the part and having a wall portion formed with an opening therein; a support extending laterally between and secured to the member and part and bridging the reservoir; said support having an opening therein above the reservoir opening; a valve housing mounted on the support over the support opening and having a fluid line connected thereto and extending through the support opening and into the reservoir opening; and means detachably connectig the fluid line to the reservoir wall portion and including a seal around the fluid line at and for sealing the reservoir opening.

14. In a tractor having a fore-and-aft body part and a side frame member alongside and spaced laterally from said part to define a mounting space at one side of which the top edge of the frame member affords a fore-and-aft marginal portion; tank-mounting means within the mounting space and below the level of said top edge and including a bracket spaced laterally from said top edge; a tank disposed in said space and having means removably supported on the tank-mounting means for enabling upward removal of the tank from said space, said tank having a wall portion formed with an opening therein; a support bridging the tank and removably secured to said top edge and to the bracket and having an opening therein above the tank opening; a valve housing carried on the support over the support opening and having a tube secured to said housing and extending through the opening and into the tank opening; means securing the housing to the support; and means removably securing the tube to the tank.

References Cited in the file of this patent

UNITED STATES PATENTS

| | | |
|---|---|---|
| 2,320,148 | Lindgren | May 25, 1943 |
| 2,533,833 | Mott | Dec. 12, 1950 |